United States Patent
Xing et al.

(10) Patent No.: US 11,645,253 B1
(45) Date of Patent: May 9, 2023

(54) MANAGING A NEW VERSION OF AN INTEGRATION FLOW DURING A ROLLING UPDATE

(71) Applicant: INTERNATIONAL BUSINESS MACHINES CORPORATION, Armonk, NY (US)

(72) Inventors: Chengxuan Xing, Romsey (GB); Ashley Donald Harrison, Southampton (GB); Matthew Paul Chapman, Eastleigh (GB); Vlad Balanescu, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/539,781

(22) Filed: Dec. 1, 2021

(51) Int. Cl.
*G06F 16/21* (2019.01)
(52) U.S. Cl.
CPC .................. *G06F 16/219* (2019.01)
(58) Field of Classification Search
CPC .................................................... G06F 16/219
See application file for complete search history.

(56) References Cited

U.S. PATENT DOCUMENTS

| | | | |
|---|---|---|---|
| 9,507,583 B2 | 11/2016 | Kurian et al. | |
| 9,916,233 B1 | 3/2018 | Qureshi et al. | |
| 10,379,826 B1 | 8/2019 | Klinger et al. | |
| 10,558,454 B2 | 2/2020 | Mair et al. | |
| 10,732,962 B1 | 8/2020 | Florescu | |
| 10,776,254 B1* | 9/2020 | Dhayanithi | G06F 11/3664 |
| 2007/0250461 A1* | 10/2007 | Sabe | G06N 3/088 |
| | | | 706/12 |
| 2012/0151498 A1 | 6/2012 | Furneaux et al. | |
| 2013/0096967 A1* | 4/2013 | Simitsis | G06Q 10/04 |
| | | | 705/7.11 |

(Continued)

FOREIGN PATENT DOCUMENTS

CN        111625249        9/2020

OTHER PUBLICATIONS

Mell et al., "The NIST Definition of Cloud Computing", NIST, Special Publication 800-145, Sep. 2011, 7 pages.

(Continued)

*Primary Examiner* — Merilyn P Nguyen
(74) *Attorney, Agent, or Firm* — Brian Restauro; Andrew D. Wright; Calderon Safran & Cole P.C.

(57) ABSTRACT

A method includes: receiving an indication of a new integration flow document that updates a current integration flow document of an integration flow; determining a last switchable node that is included in both the current integration flow document and the new integration flow document; determining, for each running instance of the integration flow using the current integration flow document, whether a currently executing node of the instance is less than or equal to the last switchable node; in response to determining the currently executing node of the instance is less than or equal to the last switchable node, switching the instance to the new integration flow document; and in response to determining the currently executing node of the instance is greater than or the last switchable node, waiting for completion of the instance using the current integration flow document.

20 Claims, 7 Drawing Sheets

(56) References Cited

U.S. PATENT DOCUMENTS

| | | | |
|---|---|---|---|
| 2013/0097592 A1* | 4/2013 | Simitsis | G06Q 10/0633 717/156 |
| 2016/0034318 A1* | 2/2016 | Byreddy | G06F 9/5072 718/105 |
| 2020/0133640 A1* | 4/2020 | Thiru | G06F 9/44505 |
| 2020/0228403 A1 | 7/2020 | Klinger et al. | |
| 2020/0403859 A1 | 12/2020 | Balanescu et al. | |
| 2021/0264333 A1 | 8/2021 | Xing et al. | |
| 2021/0385124 A1* | 12/2021 | Roy | H04L 43/0823 |

OTHER PUBLICATIONS

Anonymous, "IBM Docs", https://www.ibm.com/support/knowledgecenter/SS6KM6/com.ibm.appconnect.cloud.doc/faq.html#what-are-the-operational-limites-for-app-connect, accessed Dec. 1, 2021, 4 pages.

* cited by examiner

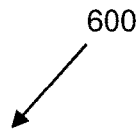

1. (1) A new version of an integration flow document is pending to be used by the system
2. (2) The last switchable node index is calculated using the following logic:
3.     let lastSwitchableNodeIndex = -1
4.     for each top level node in the existing integration flow
5.         if this node is an async node: return lastSwitchableNodeIndex
6.         else if this node is identical with the node at the same position in the new integration flow:
7.             then lastSwitchableNodeIndex = current node index
8.             else: return lastSwitchableNodeIndex
9.     return lastSwitchableNode
10. (3) Inspect the existing running process of the integration flow:
11.     flowUsingOldIntegrationDoc = 0
12.     for each of the running processes:
13.         if the currentExecutingNodeIndex <= lastSwitchableNodeIndex: then swap the flow to use the new integration flowdocument
14.         else flowUsingOldIntegrationDoc++

FIG. 6

MANAGING A NEW VERSION OF AN INTEGRATION FLOW DURING A ROLLING UPDATE

BACKGROUND

Aspects of the present invention relate generally to integration flows and, more particularly, to managing a new version of an integration flow during a rolling update.

Integration products implement trigger-action, data synchronization and batch scenarios between different applications. An integration flow is an artifact of an integration product, produced by a tool such as a graphical flow editor and executed by the integration product runtime. An integration flow is a sequence of nodes (i.e., components) that are linked together and represent an event-driven control through an integration, which is a software development activity in which separate software components are combined into an executable whole. Each of the nodes in an integration flow typically performs an integration action (e.g., accessing an external system and retrieving data from the external system, posting data to an external system, or making a call to an external system and generating data from the call). Each node in the integration flow is a component which has inputs and outputs that define an interaction (or interactions) with an object exposed by an external application. These inputs and outputs are defined in an input array and output array, respectively, for the node, and the arrays may be included in a mapping for the node. A mapping defines how to calculate, or set, values as its parameters, which are used to interact with external applications or external systems.

Integrations may be developed using tools such as integration templates and a rich graphical editing experience. Using these tools, a user may be able to organize, and re-organize, the integration flow and the locations of each component, or node, in the flow. For example, a user may be able to change the location, or move, a component using a drag and drop mechanism.

SUMMARY

In a first aspect of the invention, there is a computer-implemented method including: receiving, by a computing device, an indication of a new integration flow document that updates a current integration flow document of an integration flow; determining, by the computing device, a last switchable node that is included in both the current integration flow document and the new integration flow document; determining by the computing device, for each running instance of the integration flow using the current integration flow document, whether a currently executing node of the instance is less than or equal to the last switchable node; in response to determining the currently executing node of the instance is less than or equal to the last switchable node, switching the instance to the new integration flow document; and in response to determining the currently executing node of the instance is greater than or the last switchable node, waiting for completion of the instance using the current integration flow document.

In another aspect of the invention, there is a computer program product including one or more computer readable storage media having program instructions collectively stored on the one or more computer readable storage media. The program instructions are executable to: receive an indication of a new integration flow document that updates a current integration flow document of an integration flow; determine a last switchable node that is included in both the current integration flow document and the new integration flow document; determine, for each running instance of the integration flow using the current integration flow document, whether a currently executing node of the instance is less than or equal to the last switchable node; in response to determining the currently executing node of the instance is less than or equal to the last switchable node, switching the instance to the new integration flow document; and in response to determining the currently executing node of the instance is greater than or the last switchable node, waiting for completion of the instance using the current integration flow document.

In another aspect of the invention, there is system including a processor, a computer readable memory, one or more computer readable storage media, and program instructions collectively stored on the one or more computer readable storage media. The program instructions are executable to: receive an indication of a new integration flow document that updates a current integration flow document of an integration flow; determine a last switchable node that is included in both the current integration flow document and the new integration flow document; determine, for each running instance of the integration flow using the current integration flow document, whether a currently executing node of the instance is less than or equal to the last switchable node; in response to determining the currently executing node of the instance is less than or equal to the last switchable node, switching the instance to the new integration flow document; and in response to determining the currently executing node of the instance is greater than or the last switchable node, waiting for completion of the instance using the current integration flow document.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 shows exemplary pseudocode of a process in accordance with aspects of the invention.

DETAILED DESCRIPTION

Figure 1:
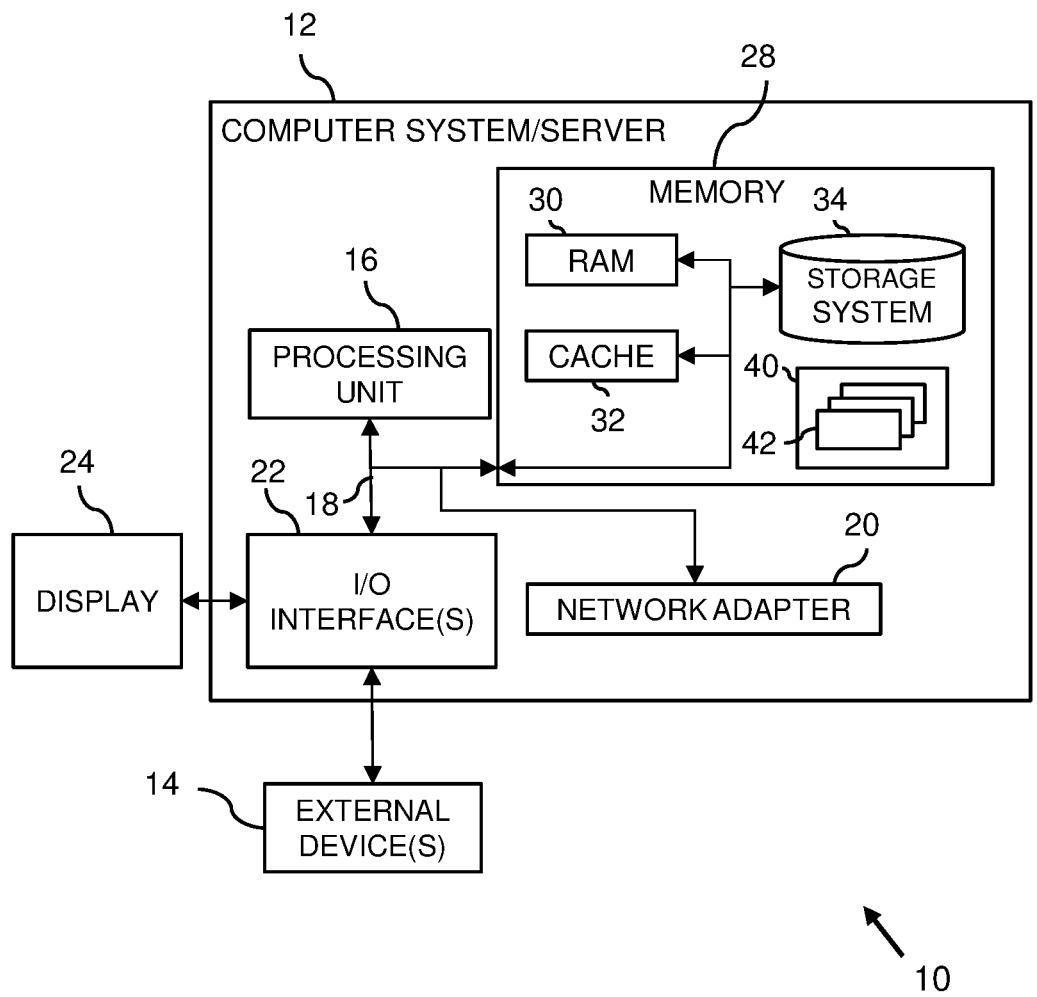
FIG. 1 depicts a cloud computing node according to an embodiment of the present invention.

Aspects of the present invention relate generally to integration flows and, more particularly, to managing a new version of an integration flow during a rolling update. For a seamless experience of updating the flow document of a running integration flow, a rolling update deployment of the flow document is used to achieve no downtime. During a rolling update, the user might have to wait for a long time for the new version to be applied across all the running instances of the flow. For example, when the rolling update is initiated, any instances that are currently running using the current flow document continue to completion using the current flow document, and any new instances start with the new flow document. In some rolling updates, instances that continue to completion using the current flow document are then re-run using the new flow document to ensure that they are run on the updated version of the flow document. Continuing to completion using the current flow document, only to then turn around and re-run using the new flow document, expends system resources and takes time. Some flows can take days or even weeks to complete, and waiting this amount of time for an instance to finish running using the current flow document before applying the update is an undesirable situation.

Implementations of the invention address this problem by providing a way to optimize the switch time of an integration flow to a newer version by comparing the underlying flow integration documents. In accordance with aspects of the invention, the system identifies a last switchable node by comparing the current and the new flow documents, which is then used to switch the existing running integration flow instances when applicable. In embodiments, the system finds a last common node in the two flow documents (the current and new documents), and any processes that are running the current document and have not yet reached the last common node are automatically switched over to running the new document so that these processes finish the flow using the new document. As a result, implementations of the invention can reduce the time of a rolling update, compared to conventional approaches, by avoiding the practice of continuing to completion using a current flow document before running again from the start of the flow using the new flow document.

In this manner, implementations of the invention provide an improvement in the technology field of integration flows by reducing the time to complete a rolling update of an integration flow. Implementations of the invention also change the operation of a computing device that is running an integration flow during a rolling update by changing the operation from using a first integration flow document to using a second integration flow document that has different instructions than the first integration flow document.

As described herein, there is a method to reduce the time needed to perform rolling updates of an integration flow by first comparing the old and new versions of the flow to identify the subset of nodes in the flow that is common, and then secondly performing the update to a running flow when the currently executing node is inside the identified subset.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
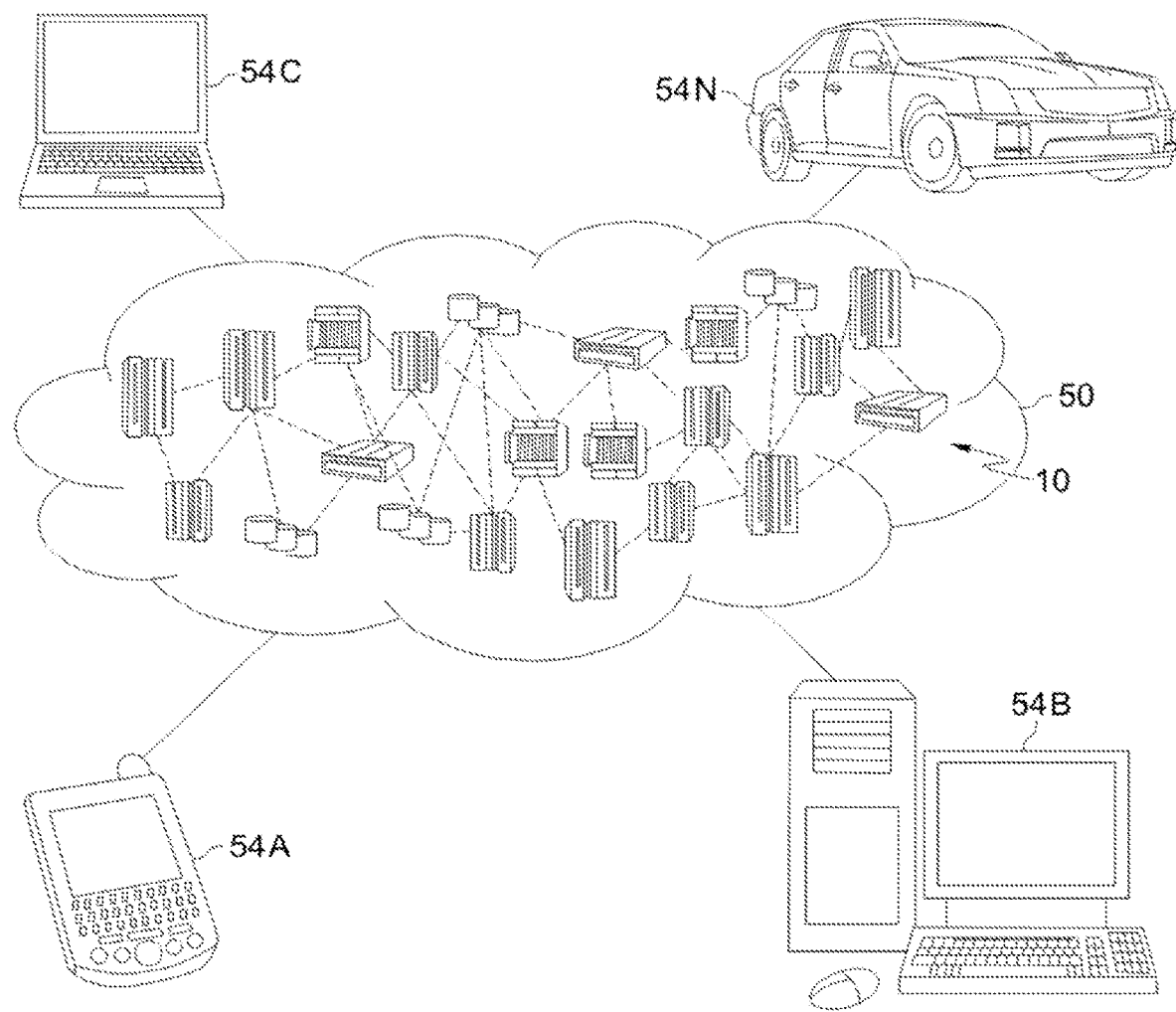
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
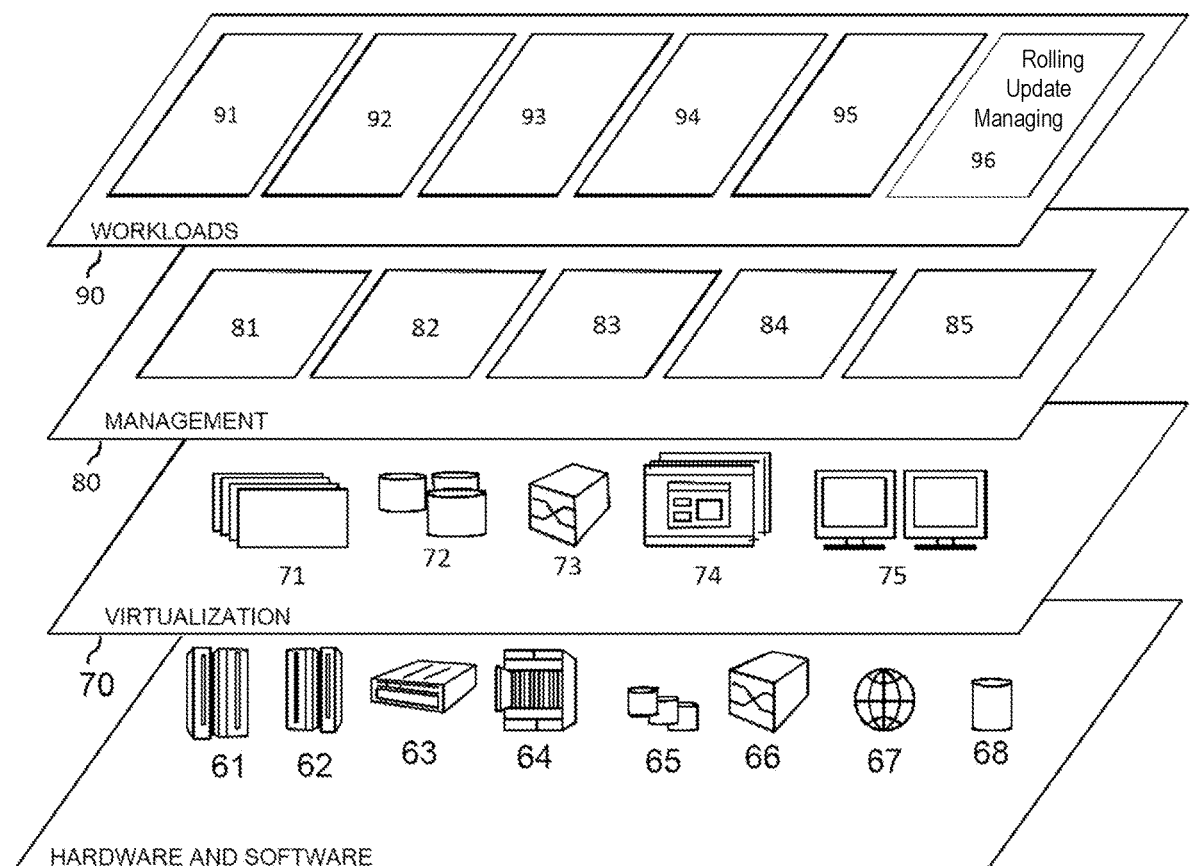
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rolling update managing 96.

Implementations of the invention may include a computer system/server 12 of FIG. 1 in which one or more of the program modules 42 are configured to perform (or cause the computer system/server 12 to perform) one or more functions of the rolling update managing 96 of FIG. 3. For example, the one or more of the program modules 42 may be configured to: receive an indication of a new integration flow document that updates a current integration flow document of an integration flow; determine a last switchable node that is included in both the current integration flow document and the new integration flow document; determine, for each running instance of the integration flow using the current integration flow document, whether a currently executing node of the instance is less than or equal to the last switchable node; in response to determining the currently executing node of the instance is less than or equal to the last switchable node, switching the instance to the new integration flow document while the instance is still running; and in response to determining the currently executing node of the instance is greater than or the last switchable node, waiting for completion of the instance using the current integration flow document.

Figure 4:
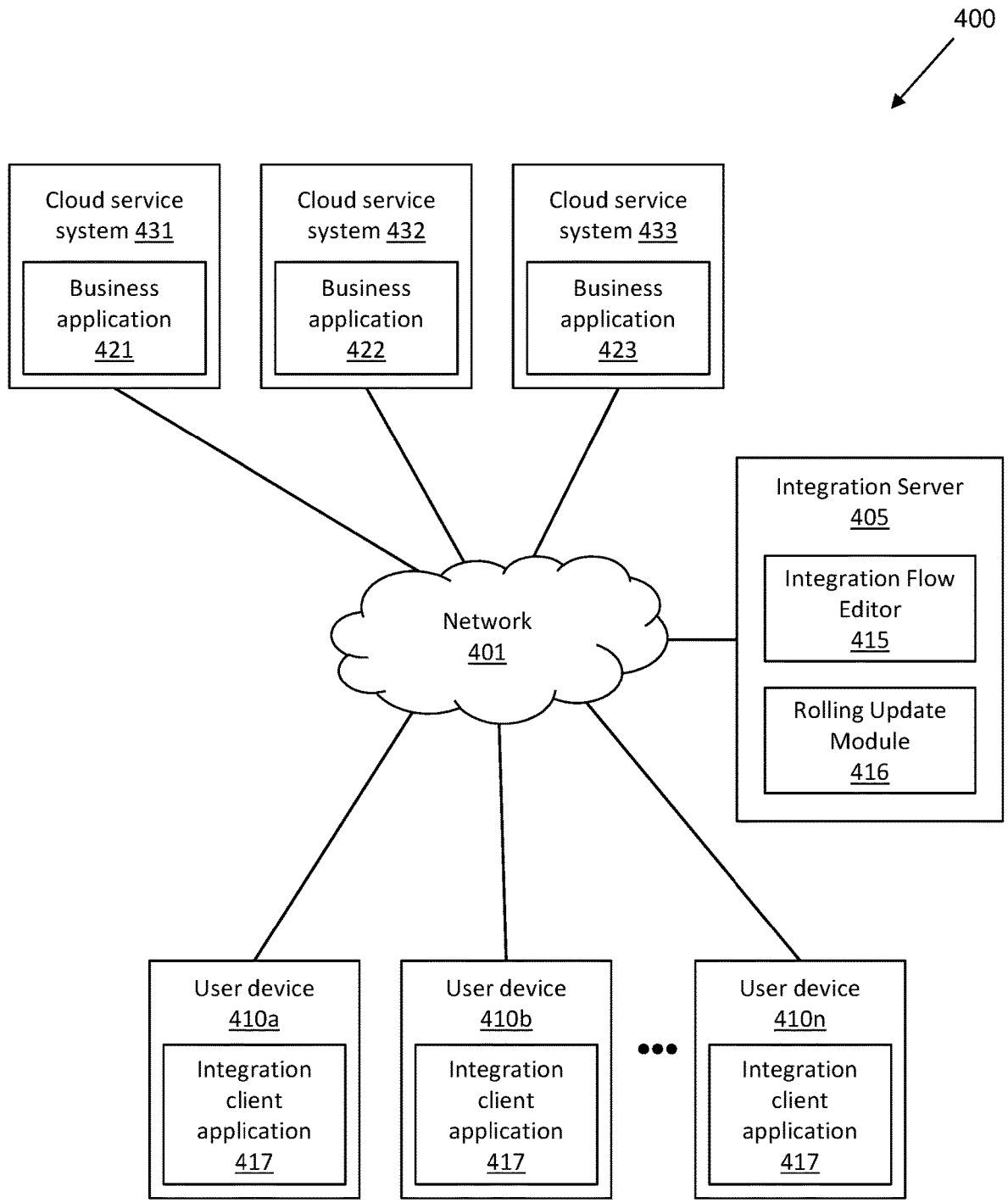
FIG. 4 shows a block diagram of an exemplary environment in accordance with aspects of the invention.

FIG. 4 shows a block diagram of an exemplary environment in accordance with aspects of the invention. In embodiments, the environment includes a network 401 providing communication between an integration server 405 and plural user devices 410a, 410b, . . . , 410n. The network 401 may comprise any one or more communication networks such as a LAN, WAN, and the Internet, and combinations thereof. In a cloud implementation, the network 401 comprises or is part of the cloud environment 50 of FIG. 2, the integration server 405 comprises one or more cloud computing nodes 10 of FIG. 2, and each of the user devices 410a-n comprises one of the local computing devices 54A-N of FIG. 2.

In embodiments, the integration server 405 runs an integration flow editor 415, which can comprise one or more programs (e.g., program/utility 40 of FIG. 1). In one example, the integration server 405 is one or more computing devices each including one or more elements of the computer system/server 12 of FIG. 1. In another example, the integration server 405 is one or more virtual machines (VMs) or containers running on one or more computing devices. In embodiments, the integration server 405 comprises a rolling update module 416, which can comprise one or more program modules (e.g., program module 42 of FIG. 1). In embodiments, the rolling update module 416 is an extension of an integration runtime that handles deployment of an integration flow. The integration server 405 may include additional or fewer programs/modules than those shown in FIG. 4. In embodiments, separate programs/modules may be integrated into a single program/module. Additionally, or alternatively, a single program/module may be implemented as multiple programs/modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

There may be any number "n" of user devices 410a-n. Each user device 410a-n comprises a computing device such as a smartphone, desktop computer, laptop computer, tablet computer, etc., and may comprise one or more elements of the computer system/server 12 of FIG. 1. In embodiments, each user device 410a-n comprises an integration client application 417 that communicates with the integration flow editor 415 to provide integration flow editing functionality to the users of the user devices 410a-n. In one example, the integration client application 417 comprises a program (e.g., program/utility 40 of FIG. 1) that is specifically related to the integration flow editor 415, e.g., as part of a same software product. In another example, the integration client application 417 is a browser application that provides web-based access to the integration flow editor 415. In embodiments, and in both examples, the integration client application 417 and the integration flow editor 415 communicate with each other to provide a user with integration flow editing functionality including but not limited to: generating, displaying, and modifying integration flows as a graphical construct in a user interface (UI) on the user device 410a-n. For example, the integration flow editor 415 may encode the structure of an integration flow in a JSON document and generate the integration flow as a graphical construct by utilizing the JSON document.

In accordance with aspects of the invention, the integration server 405 provides an integration product for multiple users of the enterprise for integrating interactions with business applications 421, 422, 423. The business applications 421-423 can be provided as cloud services on external cloud service systems 431, 432, 433. The cloud services can be referred to as Software as a Service (SaaS). One or more of the business application 421-423 can also be provided on a non-cloud based computer system local or remote to the enterprise. The systems 431-433 providing the business applications 421-423 are referred to as external systems as they are external to the integration system. In the example shown in FIG. 4, system 431 is associated with a customer relationship management service and business application 421 provides customer service, marketing automation, analytics, and application development functionality to users. In the example shown in FIG. 4, system 432 is associated with an email service and business application 422 provides email functionality to users. In the example shown in FIG. 4, system 433 is associated with a business communication platform and business application 423 provides business communication functionality (other than email) to users. These examples of services and business applications are not limiting, and different types and/or different numbers of services and/or business applications may be used in implementations of the invention.

The integration server 405 can be provided as a fully-managed integration platform on the cloud from a cloud integration service. The integration server 405 can be deployed from packaged integration assets provided to an enterprise client by a toolkit. The integration server 405 may run its own container to ensure separation of workload and to allow an enterprise client to package an application with all of its dependencies into a standard unit for software development, containing all the necessary components, including runtime, system tools and libraries to enable the client to deploy their integration solution.

Enterprise clients can use the integration flow editor 415 to build integration flows between the business applications 421-423 and the integration flows can be exposed as application programming interface (API) operations. The integration flows provide an automated movement of data between a source and a target.

In embodiments, the integration flow editor 415 and/or the rolling update module 416 perform one or more of the process described herein including: identifying a last switchable node by comparing current and new flow documents of an integration flow; and using the last switchable node to switch the existing running integration flow instances when applicable, e.g., for instances that are running the current flow document and have not yet reached the last switchable node. For example, the integration flow editor 415 and the rolling update module 416 may be configured to: receive an indication of a new integration flow document that updates a current integration flow document of an integration flow; determine a last switchable node that is included in both the current integration flow document and the new integration flow document; determine, for each running instance of the integration flow using the current integration flow document, whether a currently executing node of the instance is less than or equal to the last switchable node; in response to determining the currently executing node of the instance is less than or equal to the last switchable node, switch the instance to the new integration flow document while the instance is still running; and in response to determining the currently executing node of the instance is greater than or the last switchable node, wait for completion of the instance using the current integration flow document.

Figure 5A:
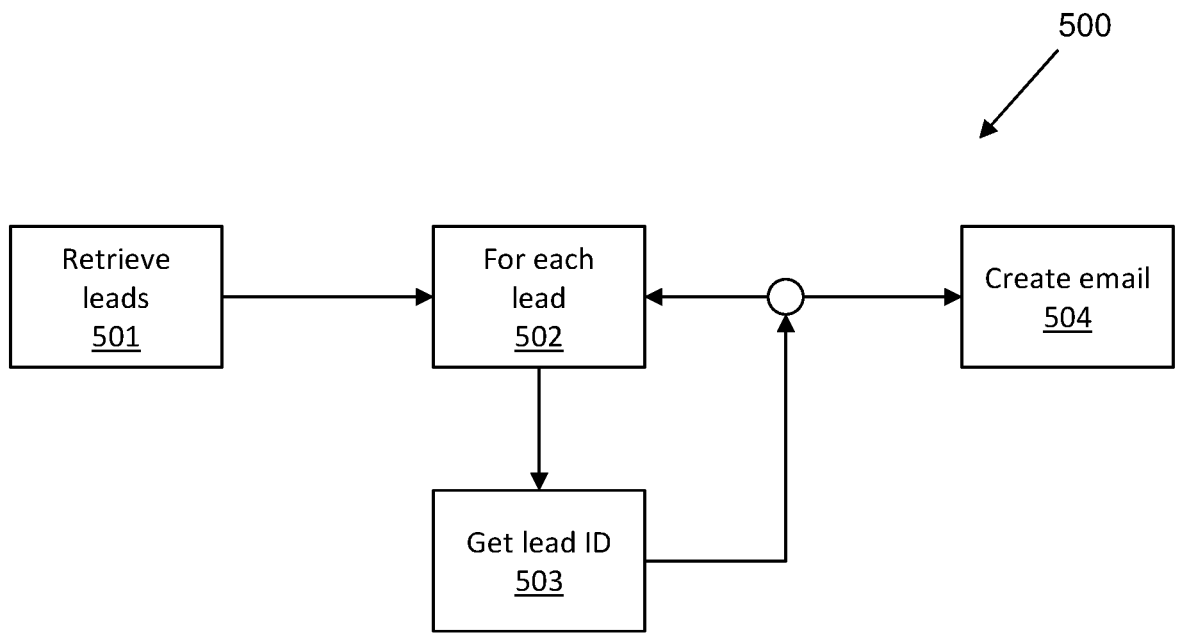
FIGS. 5A and 5B show examples of visualizations of integration flow documents in accordance with aspects of the invention.
Figure 5B:
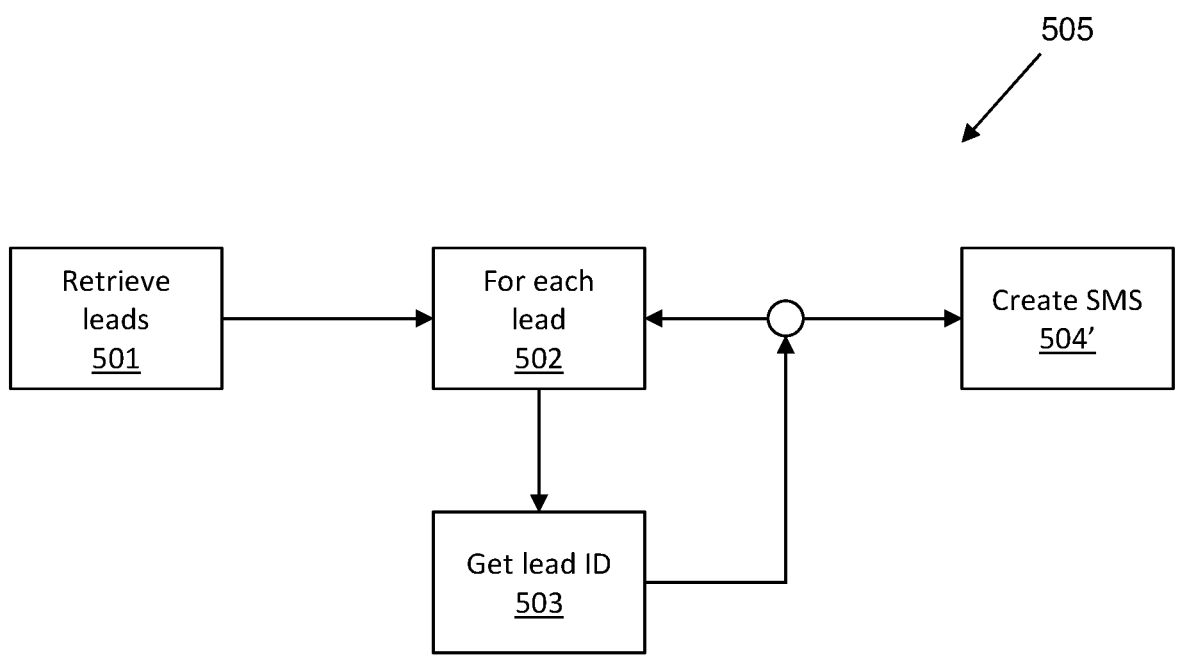

FIGS. 5A and 5B show examples of visualizations of integration flow documents in accordance with aspects of the invention. FIG. 5A shows a visualization 500 of a current integration flow document for an integration flow, and FIG. 5B shows a visualization 505 of a new/updated integration flow document for the same integration flow. For example, the integration flow editor 415 may encode the structure of the integration flow in a JSON document and generate the integration flow as a graphical construct by utilizing the JSON document, and the graphical constructs may be used to create and display the visualizations 500, 505 in a UI of the integration client application 417 on one of the user devices 410*a-n*.

In the example shown in FIG. 5A, the current integration flow document includes four nodes including: a first node 501 that retrieves leads using the business application 421 of FIG. 4; a second node 502 that initiates a loop to process of each of the retrieved leads; a third node 503 that performs a task (e.g., get lead ID) for one of the retrieved leads; and a fourth node 504 that creates an email (using the lead IDs from step 503) using the business application 422 of FIG. 4. In the example shown in FIG. 5A, the nodes 501, 502, 504 are top level nodes, and any nodes that are not included in the top level are not top level nodes (e.g., node 503 is below the top level and thus is not a top level node). Running an instance of this exemplary integration flow causes the system to use a first external application (e.g., business application 421) to retrieve certain data, process the retrieved data, and use a second external application (e.g., business application 422) to send emails based on the processing the retrieved data.

In the example shown in FIG. 5B, the new integration flow document includes four nodes including: the first node 501 that retrieves leads using the business application 421 of FIG. 4; the second node 502 that initiates a loop to process of each of the retrieved leads; the third node 503 that performs a task (e.g., get lead ID) for one of the retrieved leads; and a fourth node 504' that creates an SMS message (using the lead IDs from step 503) using the business application 423 of FIG. 4. In the example shown in FIGS. 5A and 5B, the nodes 501, 502, 503 are identical in both the current integration flow document and the new integration flow document. The difference between the flow documents is the fourth node, i.e., node 504 and node 504' respectively. In an example, a user created the new integration flow document by opening the current integration flow document in the UI of the integration client application 417, editing the integration flow document by changing node 504 to node 504', and providing input in the UI to update the integration flow document.

In accordance with aspects of the invention, in response to receiving this input (or similar input) to update the integration flow document for an integration flow, the rolling update module 416 identifies a last switchable node in the current integration flow document and the new integration flow document. In embodiments, the last switchable node is the last identical node that is in the top level of both flow documents excluding asynchronous nodes. In embodiments, an asynchronous node is a node that triggers another flow that runs asynchronously relative to the current integration flow. In embodiments, last in this context refers to the order of execution of the nodes as defined by the integration flow document. In the example of FIGS. 5A and 5B, the last identical node that is in the top level of both flow documents is node 502. In embodiments, the rolling update module 416 identifies the last switchable node by analyzing and comparing data defining each of the nodes in the current integration flow document and the new integration flow document, this data being contained in the respective integration flow documents.

In accordance with aspects of the invention, in response to identifying the last switchable node that is contained in both the current integration flow document and the new integration flow document, the rolling update module 416 analyzes each currently running instance of the integration flow that is using the current integration flow document and determines whether the running instance is at a node in the integration flow that is before or the same as the last switchable node. In embodiments, the rolling update module 416 analyzes the runtime status of the running instance to determine a currently executing node, which is the node in the integration flow document that is currently being executed. In embodiments, the rolling update module 416 compares this determined currently executing node to the last switchable node to determine whether the currently executing node is: (i) before the last switchable node in the current integration flow document; (ii) the same as last switchable node in the current integration flow document; or (iii) after the last switchable node in the current integration flow document. In embodiments, the terms before, same, and after in this context refer to the order of execution of the nodes as defined by the integration flow document.

In accordance with aspects of the invention, in response to determining the currently executing node is (i) before the last switchable node in the current integration flow document or (ii) the same as last switchable node in the current integration flow document, the rolling update module 416 switches this running instance of the integration flow to use the new integration flow document instead of the current integration flow document. In one example of switching, the rolling update module 416 uses a migration process. In another example of switching, the rolling update module 416 preserves all the data that is associated with (e.g., has been generated by) this running instance and applies that data at the same node (e.g., the currently executing node) in the new integration flow document. In embodiments, and in both examples, the running instance then completes its execution from this node using the integration flow defined by the new integration flow document. In this manner, implementations of the invention compete the rolling update for this particular instance by switching to the new integration flow document without waiting for the instance to run to completion using the current integration flow document and without re-running the same instance in its entirety using the new integration flow document.

In accordance with aspects of the invention, in response to determining the currently executing node is (iii) after the last switchable node in the current integration flow document, the rolling update module 416 waits for completion of this running instance of the integration flow using the current integration flow document. In this situation, the rolling update module 416 does not switch to the new integration flow document because doing so would produce a runtime error or an unintended result. In embodiments, after completion of this running instance of the integration flow using the current integration flow document, the rolling update module 416 then re-runs this instance using the new integration flow document to complete the rolling update.

An exemplary use case will now be described with reference to FIGS. 5A and 5B to illustrate aspects of the invention. In this example, a user has an existing integration flow (represented by 500) that retrieves leads from business application 421 at node 501 and then invokes a customized API (application program interface) for each of the records sequentially at nodes 502 and 503. After all the leads are processed at nodes 502 and 503, an email is sent at node 504 using business application 422. In this example, the user modifies the integration flow to change the last node from sending an email (node 504) to sending an SMS message (node 504'). In this example, the entire flow takes 5.5 minutes to complete. Continuing this example, when the user provides input to the system to update the integration flow, the system determines that there are four currently running instances of the integration flow in the integration flow runtime. In this example, the four running instances are: Instance1 has completed node 501 and has an estimated completion time of 5 minutes for the remainder of the flow; Instance2 has completed node 502 and has an estimated completion time of 10 seconds for the remainder of the flow; Instance3 is currently processing node 503 and has an estimated completion time of 4 minutes for the remainder of the flow; and Instance4 is currently processing node 504 and has an estimated completion time of 1 second for the remainder of the flow.

Continuing this exemplary use case, in a conventional system that does not include aspects of the invention, such a system will complete all four instances (Instance1-4) using the current integration flow document, and then re-run all four instances using the new integration flow document. This will take at least 5 minutes for all four instances to complete (due to Instance1 having an estimated completion time of 5 minutes) before re-running using the new integration flow document which takes another 5.5 minutes to complete. In contrast, a system that operates in accordance with aspects of the invention takes only a matter of seconds to migrate Instances1-3 to the new integration flow document and then runs these instances to completion using the new integration flow document (with their respective estimated times to completion being the same as before). In this example, the rolling update module 416 operates to: compare the two integration flow documents and determine that the last switchable node is node 502; check all four running instances (Instance1-4) in the integration runtime and switch Instances1-3 to the new integration flow document because their currently executing node is less than or equal to the last switchable node; wait for Instance4 to complete using the current integration flow document; and tell the user that the update to the new version of the integration flow document is complete. In this manner, the rolling update of Instances1-3 is completed faster than would be done with a conventional system.

FIG. 6 shows exemplary pseudocode 600 of a process in accordance with aspects of the invention. Line 1 of the pseudocode 600 corresponds to a first step of receiving an indication of a new integration flow document that updates a current integration flow document of an integration flow. Lines 2-9 of the pseudocode 600 correspond to a second step of determining a last switchable node that is included in both the current integration flow document and the new integration flow document. Lines 3-14 of the pseudocode 600 correspond to a third step of determining for each running instance of the integration flow using the current integration flow document, whether a currently executing node of the instance is less than or equal to the last switchable node, and determining whether the continue with the current integration flow document or switch to the new integration flow document. The rolling update module 416 may be programmed with code corresponding to the pseudocode 600 to perform one or more steps of the method of FIG. 7 described herein.

Figure 7:
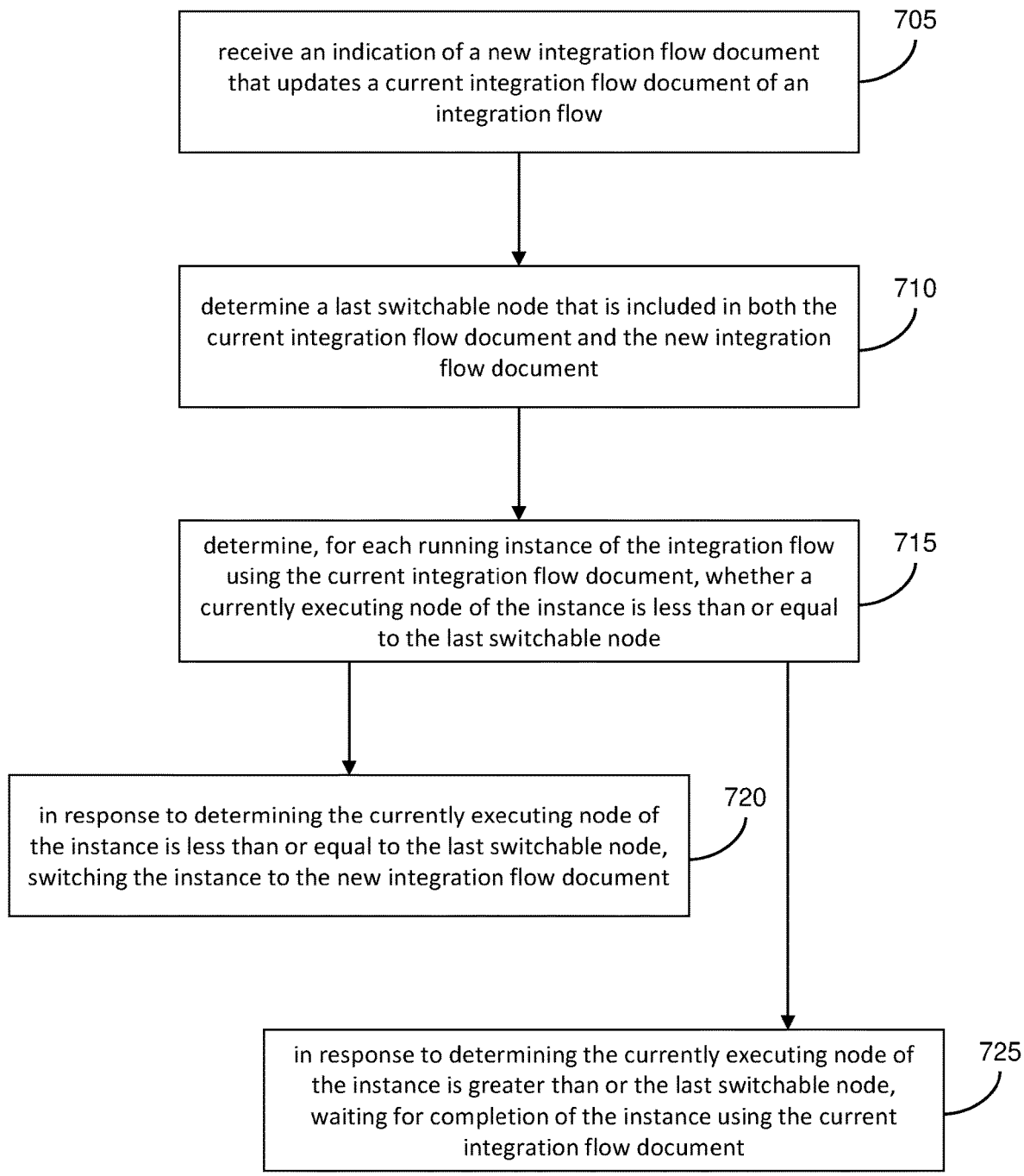
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIGS. 4, 5A, and 5B.

At step 705, the system receives an indication of a new integration flow document that updates a current integration flow document of an integration flow. In embodiments, and as described with respect to FIG. 4, the rolling update module 416 receives input from a UI, the input indicating a new integration flow document (e.g., as shown at 504') that is an update to a current integration flow document (e.g., as shown at 504).

At step 710, the system determines a last switchable node that is included in both the current integration flow document and the new integration flow document. In embodiments, and as described with respect to FIG. 4, the rolling update module 416 determines the last switchable node by analyzing the node data contained in the current integration flow document and the new integration flow document.

At step 715, the system determines, for each running instance of the integration flow using the current integration flow document, whether a currently executing node of the instance is less than or equal to the last switchable node. In embodiments, and as described with respect to FIG. 4, the rolling update module 416 analyzes the integration runtime to determine the currently executing node for each instance, and compares the currently executing node to the last switchable node.

At step 720, in response to determining the currently executing node of the instance is less than or equal to the last switchable node, the system switches the instance to the new integration flow document. At step 725, in response to determining the currently executing node of the instance is greater than or the last switchable node, the system waits for completion of the instance using the current integration flow document.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, an indication of a new integration flow document that updates a current integration flow document of an integration flow;
determining, by the computing device, a last switchable node that is included in both the current integration flow document and the new integration flow document;
determining by the computing device, for each running instance of the integration flow using the current integration flow document, whether a currently executing node of the instance is less than or equal to the last switchable node;
in response to determining the currently executing node of the instance is less than or equal to the last switchable node, switching the instance to the new integration flow document; and
in response to determining the currently executing node of the instance is greater than the last switchable node, waiting for completion of the instance using the current integration flow document.

2. The method of claim 1, further comprising, in response to completion of the instance using the current integration flow document, running a new instance of the integration flow using the new integration flow document.

3. The method of claim 1, wherein the determining the last switchable node comprises analyzing the current integration flow document and the new integration flow document.

4. The method of claim 3, wherein the analyzing the current integration flow document and the new integration flow document comprises analyzing top-level nodes in the current integration flow document and the new integration flow document.

5. The method of claim 4, wherein the analyzing ignores asynchronous nodes.

6. The method of claim 3, wherein the analyzing the current integration flow document and the new integration flow document comprises analyzing only top-level nodes in the current integration flow document and the new integration flow document.

7. The method of claim 6, wherein the analyzing ignores asynchronous nodes.

8. A computer program product comprising one or more computer readable storage media having program instructions collectively stored on the one or more computer readable storage media, the program instructions executable to:
receive an indication of a new integration flow document that updates a current integration flow document of an integration flow;
determine a last switchable node that is included in both the current integration flow document and the new integration flow document;
determine, for each running instance of the integration flow using the current integration flow document, whether a currently executing node of the instance is less than or equal to the last switchable node;

in response to determining the currently executing node of the instance is less than or equal to the last switchable node, switching the instance to the new integration flow document; and in response to determining the currently executing node of the instance is greater than the last switchable node, waiting for completion of the instance using the current integration flow document.

9. The computer program product of claim 8, wherein the program instructions are executable to, in response to completion of the instance using the current integration flow document, run a new instance of the integration flow using the new integration flow document.

10. The computer program product of claim 8, wherein the determining the last switchable node comprises analyzing the current integration flow document and the new integration flow document.

11. The computer program product of claim 10, wherein the analyzing the current integration flow document and the new integration flow document comprises analyzing top-level nodes in the current integration flow document and the new integration flow document.

12. The computer program product of claim 11, wherein the analyzing ignores asynchronous nodes.

13. The computer program product of claim 10, wherein the analyzing the current integration flow document and the new integration flow document comprises analyzing only top-level nodes in the current integration flow document and the new integration flow document.

14. The computer program product of claim 13, wherein the analyzing ignores asynchronous nodes.

15. A system comprising:
a processor, a computer readable memory, one or more computer readable storage media, and program instructions collectively stored on the one or more computer readable storage media, the program instructions executable to:
receive an indication of a new integration flow document that updates a current integration flow document of an integration flow;

determine a last switchable node that is included in both the current integration flow document and the new integration flow document;

determine, for each running instance of the integration flow using the current integration flow document, whether a currently executing node of the instance is less than or equal to the last switchable node;

in response to determining the currently executing node of the instance is less than or equal to the last switchable node, switching the instance to the new integration flow document; and in response to determining the currently executing node of the instance is greater than the last switchable node, waiting for completion of the instance using the current integration flow document.

16. The system of claim 15, wherein the program instructions are executable to, in response to completion of the instance using the current integration flow document, run a new instance of the integration flow using the new integration flow document.

17. The system of claim 15, wherein the determining the last switchable node comprises analyzing the current integration flow document and the new integration flow document.

18. The system of claim 17, wherein the analyzing the current integration flow document and the new integration flow document comprises analyzing top-level nodes in the current integration flow document and the new integration flow document.

19. The system of claim 18, wherein the analyzing ignores asynchronous nodes.

20. The system of claim 17, wherein the analyzing the current integration flow document and the new integration flow document comprises analyzing only top-level nodes in the current integration flow document and the new integration flow document.

* * * * *